(12) United States Patent
Biermann et al.

(10) Patent No.: US 9,115,795 B2
(45) Date of Patent: Aug. 25, 2015

(54) SUSPENDED MOUNTING OF A DIFFERENTIAL

(71) Applicant: Schaeffler Technologies GmbH & Co. KG, Herzogenaurach (DE)

(72) Inventors: Thorsten Biermann, Wachenroth (DE); Harald Martini, Herzogenaurach (DE); Markus Mantau, Veitsbronn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/480,055

(22) Filed: Sep. 8, 2014

(65) Prior Publication Data

US 2014/0378264 A1    Dec. 25, 2014

Related U.S. Application Data

(63) Continuation of application No. PCT/EP2013/056518, filed on Mar. 27, 2013.

(30) Foreign Application Priority Data

Apr. 19, 2012   (DE) .................. 10 2012 206 440

(51) Int. Cl.
| | | |
|---|---|---|
| F16H 48/10 | (2012.01) | |
| F16H 57/08 | (2006.01) | |
| F16H 48/11 | (2012.01) | |
| F16H 48/40 | (2012.01) | |

(52) U.S. Cl.
CPC ............. *F16H 48/10* (2013.01); *F16H 48/11* (2013.01); *F16H 57/082* (2013.01); *F16H 2048/106* (2013.01); *F16H 2048/405* (2013.01)

(58) Field of Classification Search
CPC ... F16H 48/10; F16H 48/11; F16H 2048/106; F16H 2048/40; F16H 2048/405; F16H 57/082
USPC .................... 475/248, 249, 252, 253
See application file for complete search history.

(56) References Cited

U.S. PATENT DOCUMENTS

| | | | |
|---|---|---|---|
| 2,142,575 A | | 1/1939 | Spicacci |
| 2,947,202 A | * | 8/1960 | Montalva-Calderon ...... 475/248 |
| 5,078,661 A | * | 1/1992 | Esaki ............................ 475/249 |
| 7,775,928 B2 | | 8/2010 | Zink |
| 2011/0045934 A1 | * | 2/2011 | Biermann et al. ............ 475/252 |

FOREIGN PATENT DOCUMENTS

| | | |
|---|---|---|
| DE | 10156890 C1 | 4/2003 |
| DE | 102009017397 A1 | 11/2009 |
| EP | 0156067 A1 | 10/1985 |
| WO | 2010112366 A1 | 10/2010 |

\* cited by examiner

*Primary Examiner* — Jacob S Scott
(74) *Attorney, Agent, or Firm* — Simpson & Simpson, PLLC (57) ABSTRACT

A planetary gear (1) such as a differential gear, with a planetary carrier (3) on which planetary wheels (5, 6) are rotatively connected, with at least one sun gear (9, 10, 11) in meshing engagement, whereby the planetary carrier (3) can be connected to a drive wheel (15) such as a spur wheel (16), whereby further comprising a rolling bearing (20) having an inner bearing ring (29) and an outer bearing ring (28) for the axial and/or radial positioning of the planetary carrier (3) with respect to a fixed housing such as a gear housing, characterized in that an outer bearing ring (28) between the inner bearing ring (29) and the planetary support (3) is forced as far as a seating region radially inwards of the planetary carrier (3) for connection to the planetary carrier (3).

14 Claims, 11 Drawing Sheets

SUSPENDED MOUNTING OF A DIFFERENTIAL

CROSS-REFERENCE TO RELATED APPLICATIONS

This application is filed under 35 U.S.C. §120 and §365(c) as a continuation of International Patent Application PCT/EP2013/056518, filed Mar. 27, 2013, which application claims priority from German Patent Application No. DE102012206440.0, filed Apr. 19, 2012, which applications are incorporated herein by reference in their entirety.

FIELD OF THE INVENTION

The invention relates to a planetary gear such as a differential gear comprising a planetary carrier, to which planetary wheels that mesh with at least one sun gear are rotatively attached, whereby said planetary carrier is connected to a drive wheel, such as a spur wheel, and whereby further a bearing, such as a rolling bearing, is provided with two bearing rings, such as an inner bearing ring and an outer bearing ring for the axial and/or radial positioning of the planetary carrier with respect to a fixed housing such as a gear housing. The planetary carrier may also be referred to as a cage that, in particular, may be designed as a differential cage.

BACKGROUND OF THE INVENTION

Different planetary gears are already known from the prior art, for example from EP 0156067.

In principle, differential gears for automotive vehicles are known from DE 10156890 C1. A differential gear is disclosed for an automotive vehicle with a differential housing having a drive sprocket supported in a housing wall, in which a differential bolt is arranged with at least a rotatively mounted differential pinion that engages with a drive gear of a drive shaft mounted in the differential housing. The drive shaft is supported by at least a first bearing in the housing wall of the differential gear and/or the differential housing by means of at least one second bearing for the drive shaft, while the drive shaft has a common bearing bush for the first bearing serving as a shaft bearing of the drive shaft and the housing bearing of the differential housing.

A differential arrangement engaging with bevel gears is also known from U.S. Pat. No. 7,775,928.

Furthermore, a gear arrangement that engages with planetary wheels is known from DE 10 2009 017 397 A1. The gear arrangement introduced there relates to a differential gear with a drive-side wheel member, a first drive wheel that is rotatively fixed to a first driven axle, while a second drive wheel is rotatively fixed to a second driven axle, whereby between the first drive wheel and the second drive wheel, a gear assembly is provided for transmitting torque from the drive side wheel member to the first drive wheel and second drive wheel. The first drive wheel member in this case has the form of a first drive wheel with a bulge that is radially spaced from the first drive axle. The second drive member further has the form of a second drive wheel extending radially outwards from the second drive axle. Further, the bulge extends further away from the second drive wheel. The gear assembly is disposed in a space formed by the protrusion of the first drive wheel and the opposite region of the space formed by the second drive wheel.

Such planetary gears, which are designed as differential gears, may be formed as spur wheel differential gears as they are known, for example, from WO 2010/112366 A1. The spur wheel differential gear arrangement presented there, discloses the operational capability in an automotive vehicle. In this case, each toothed helical sun gear, planetary wheel and a hollow wheel are supported by a surrounding housing with bearings, so that the parallel sun gears are each coupled with parallel drive shafts. It is disclosed in this publication that frictional surfaces are disposed between the parallel sun gears and/or between the sun gears and the surrounding housing.

However, these known planetary gears have the disadvantage that they require a lot of axial space.

BRIEF SUMMARY OF THE INVENTION

It is the object of the present invention to remedy this situation and to create a space-saving, especially axial space-saving improvement, which is both long-lasting and is at least cost-neutral, or is able in the optimal case to reduce costs.

According to the invention, this task is solved by forcing an outer bearing ring between the inner bearing ring and the planetary carrier as far as a seating region located radially inside the planetary carrier for connection to the planetary carrier.

The bearing diameter of the rolling bearing for supporting the planetary carrier, also referred to as a differential cage, may be enlarged, whereby the outer bearing ring of the rolling bearing is drawn radially and laterally in the direction of a central axis of the differential to the inner bearing ring. The differential cage is suspended from the outer bearing ring, so that, differing from the standard approach where the outer bearing diameter of the housing seat, i.e., the seat of the differential cage, is always larger than the shaft seat, the outside diameter of the housing seat may now be made smaller than the shaft seat.

It is of advantage when the inner bearing ring is swaged. Costs can then be reduced and the life increased.

It is also advantageous when the inner bearing ring has an axially protruding collar portion which can be brought into contact with the sun gear. The inner bearing ring can then be simultaneously used for the centering of the sun gear.

The forces may be further optimized if the planetary carrier has an axially extending collar portion which can be brought into contact with the sun gear. A variant is also disclosed where the two collar portions of the planetary carrier and the inner bearing ring, respectively, are parallel to one another, whereby one of the two collar portions protrudes axially over the other in the direction of the sun gear. However, a flush arrangement is also conceivable. According to the application, the forces may then be absorbed optimally.

It is also advisable when the outer bearing ring is formed as a one piece cold formed part with a raceway for the rolling elements.

An advantageous embodiment is also disclosed wherein the planetary carrier extends radially further inwards than the inner raceway.

In order to achieve advantageous sealing and support effects, it is advantageous if a cover is arranged in the radial position of the planetary carrier and/or the inner bearing ring, which preferably has a U-shaped profile surrounding a hole.

It is also advantageous if the planetary gear is formed as a spur wheel differential comprising two sun gears, each of which is in meshing engagement with at least one planetary wheel of a planetary wheel set. It is then possible to achieve a particularly compact planetary gear design construction that is simultaneously highly resilient and cost-effective. It should also be noted that the two planetary wheels of a planetary wheel set are each to be brought into meshing engagement.

In order to achieve a positive self-limiting effect, it is also advantageous if a friction disc is located between the sun gears.

It is further advantageous if the outer bearing ring is connected material-wise, shape-wise and/or force-fitting-wise to the planetary carrier.

It is also advantageous if a connection part that connects the planetary carrier to the rolling bearing is deep-drawn and manufactured.

BRIEF DESCRIPTION OF THE DRAWINGS

Additional features, advantages, and effects of the invention are discernible from a preferred exemplary embodiment of the invention as well as the attached drawings, wherein.

DETAILED DESCRIPTION OF THE INVENTION

Figure 1:
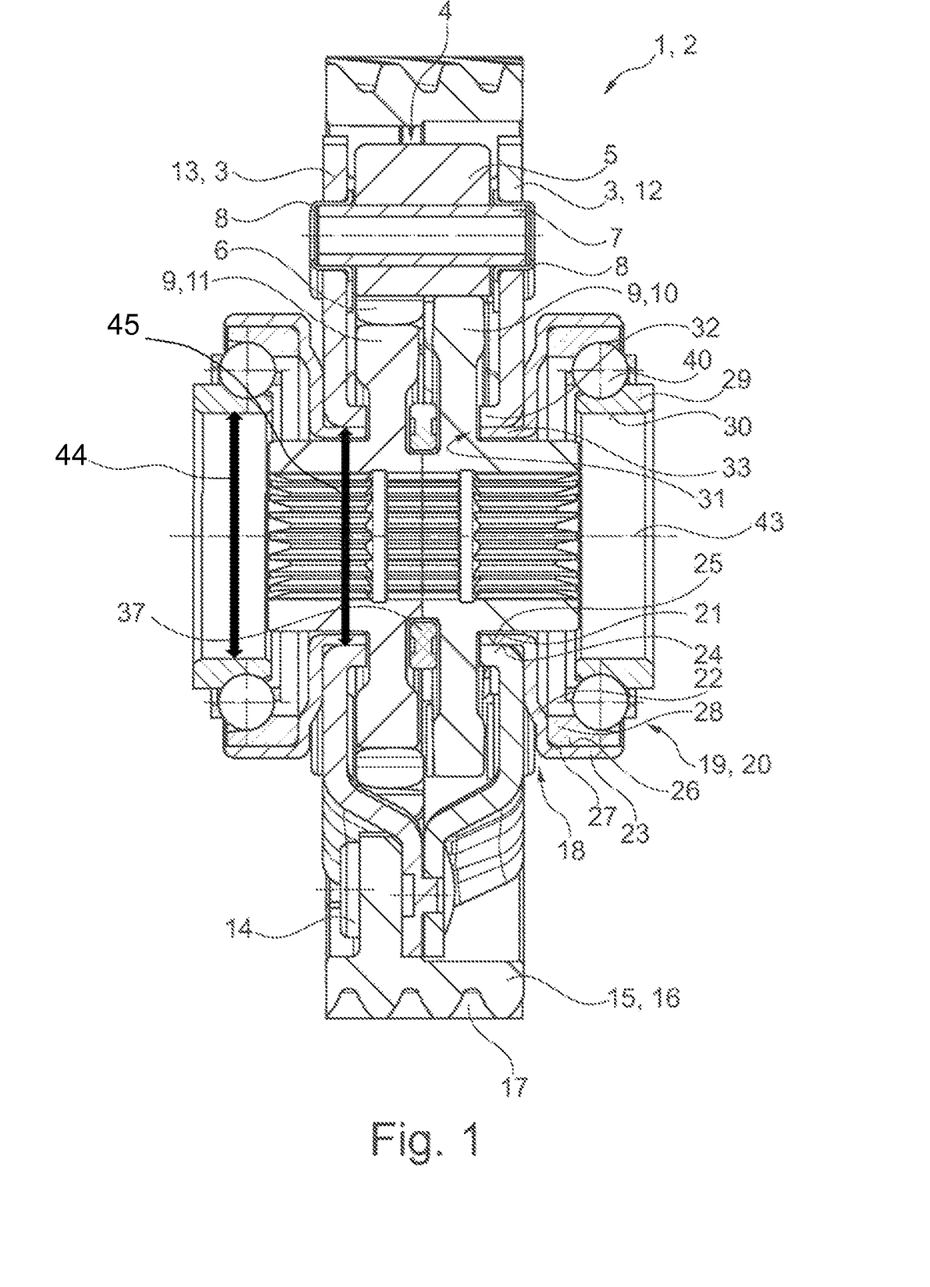
FIG. 1 shows a planetary gear in a longitudinal sectional view.

A first specific form of a planetary gear 1 is shown in FIG. 1. The planetary gear 1 is designed as a differential gear, in particular as a spur wheel differential gear 2. It includes a planetary carrier 3, which may be referred to as a cage, in particular a differential cage. The planetary carrier 3 may also be referred to as a planetary wheel carrier.

The planetary wheel sets 4, each of which has a first planetary wheel 5 and a second planetary wheel 6, are supported on the planetary carriers 3 by respective bolts 7 that are located in bearing sleeves 8. The planetary wheels 5 and 6 are connected in operative contact with sun gear 9. In this case, first planetary wheel 5 meshes in operative engagement with first sun gear 10, while the second planetary wheel 6 meshes in operative engagement with second sun gear 11. Bolt 7 is designed as a hollow bolt. The two planetary wheels 5 and 6 of planetary wheel set 4 can be meshed together in operative engagement.

Advantageously, three, four, five, six or seven planetary wheel sets 4 are used, each having first planetary wheel 5 and second planetary wheel 6.

The planetary carrier 3 has first half 12 and second half 13 which are connected via connecting element 14 such as a rivet to drive wheel 15 which is designed as spur wheel 16. Spur wheel 16 has externally angled teeth 17.

Planetary carrier 3 is connected via separate connection part 18 with bearing 19, which is formed as rolling bearing 20. Rolling bearing 20 is designed as an angular contact ball bearing. Angular contact ball bearings are respectively located in both first half 12 of planetary carrier 3 and second half 13 of planetary carrier 3. Tapered roller bearings are also possible. Rolling bearing 19, 20 includes inner diameter 44 and planetary carrier 3 includes inner diameter 45. Inner diameter 44 is larger than inner diameter 45. In other words, inner diameter 45 of planetary carrier 3 is smaller than inner diameter 44 of rolling bearing 19, 20.

In this case, connection part 18 has first flange portion 21, which is connected via connecting portion 22 with second flange portion 23. In this case, first flange portion 21 forms first interface 24, which is in contact with inner surface 25 of planetary carrier 3. Second flange portion 23 also forms second interface 26 which is in contact with outer surface 27 of bearing 19. In this case, second interface 26 is applied to outer ring 28 of rolling bearing 20.

Figure 2:
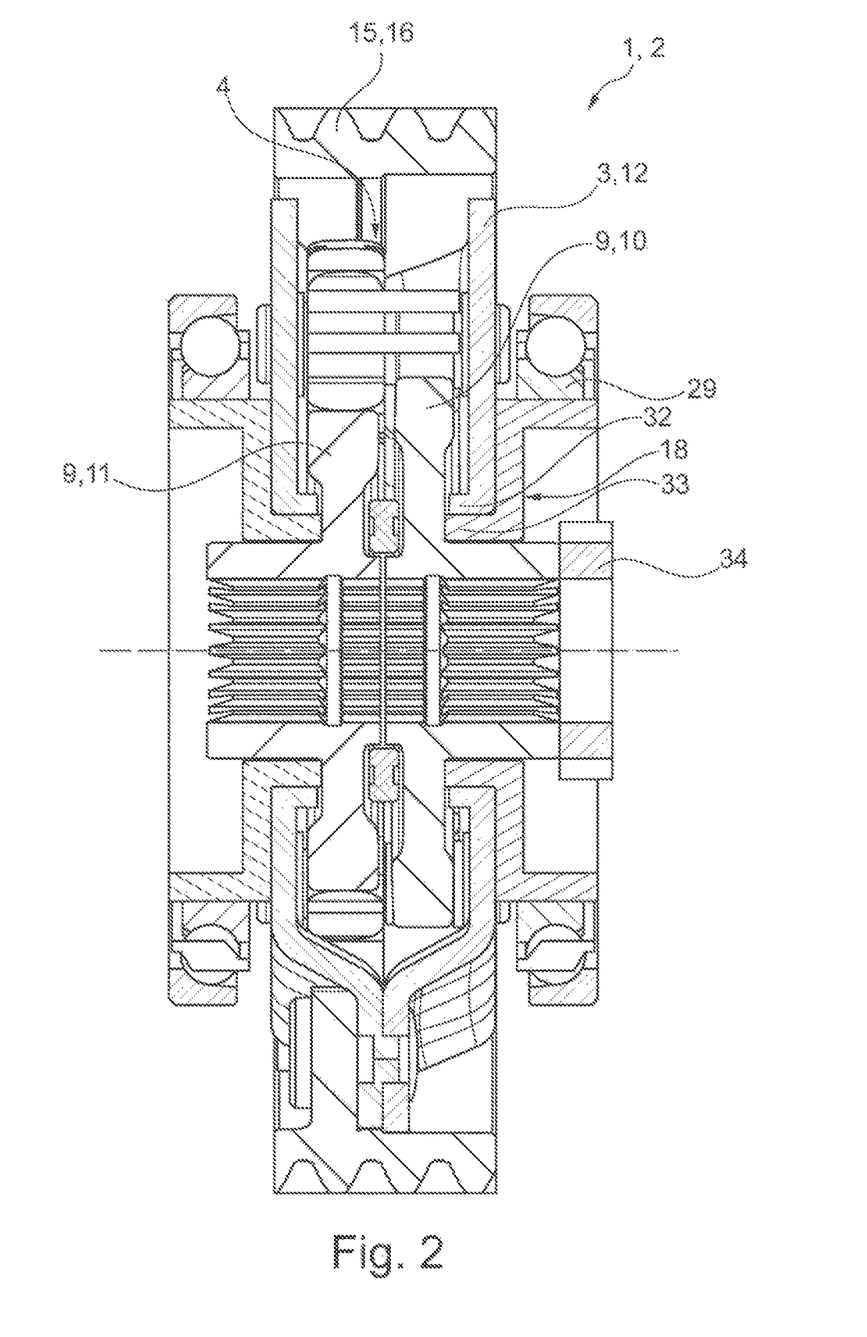
FIG. 2 shows a further illustration of the planetary gear in a longitudinal section.

However, it is possible that, as shown in FIG. 2, inner ring 29 of rolling bearing 20 lies against second interface 26 with an inwardly facing surface of inner ring 30.

While in the version shown in FIG. 1, only a certain region of connecting portion 25 lies radially against planetary carrier 3, in the version shown in FIG. 2, all or nearly all of connecting portion 22 extending axially in the radial direction, lies against planetary carrier 3. Connection part 18 is formed as a sheet metal part, especially as a sheet-metal sleeve.

While in the version shown in FIG. 1, both planetary carrier 3 as well as connection part 18 form collar 31, while in the version according to FIG. 1, planetary support 3 with collar portion 32 lies against first sun gear 10, while connection part 18 with collar portion 33 lies against first sun gear 10, but in the version of FIG. 2, only collar portion 33 of connection part 18 lies against sun gear 9.

As also shown in FIG. 2, external teeth, like sprocket wheel 34 are provided at least on one of sun gears 9.

Figure 7:
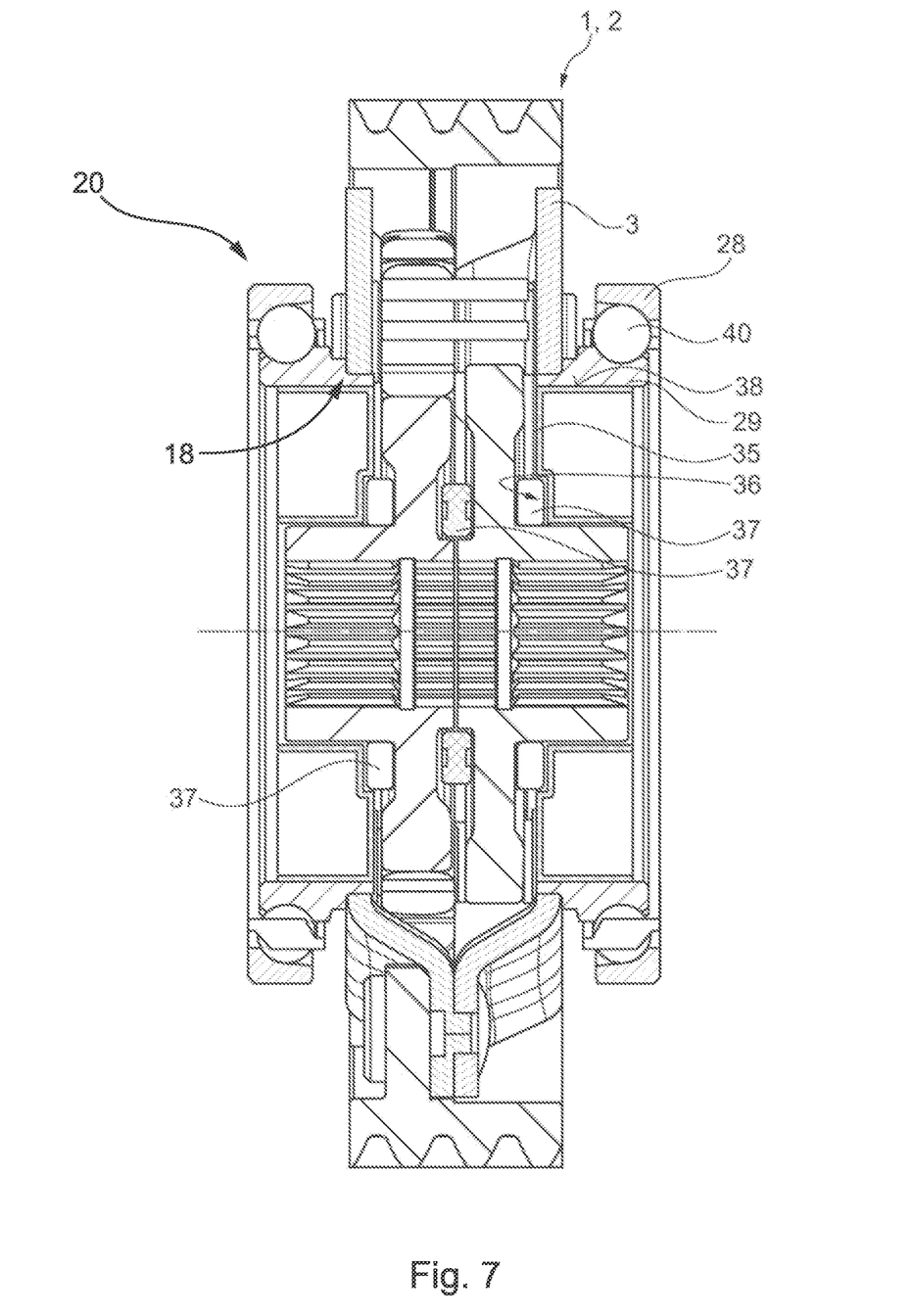
FIG. 7 shows a special planetary gear.

In the gear according to FIG. 7, connection part 18 connects planetary carrier 3 with rolling bearing 20. Connection part 18 is integral with inner bearing ring 29 and includes a seat for planetary carrier 3. Pot-like cover 35 is configured with thin walls when compared with the planetary carrier, particularly, only half of the wall thickness, or, advantageously, only one third to one quarter of the wall thickness of planetary carrier 3. Friction disc 37 is located in recess 36 that is in contact with sun gear 9, in particular first sun gear 10 or second sun gear 11.

Cover 35 has axially extending outer surface 38 which is at the same height measured in a radial direction and is in contact with both planetary carrier 3 as well as inner ring 29, in particular inner surface 30 of inner ring 29.

Figure 10:
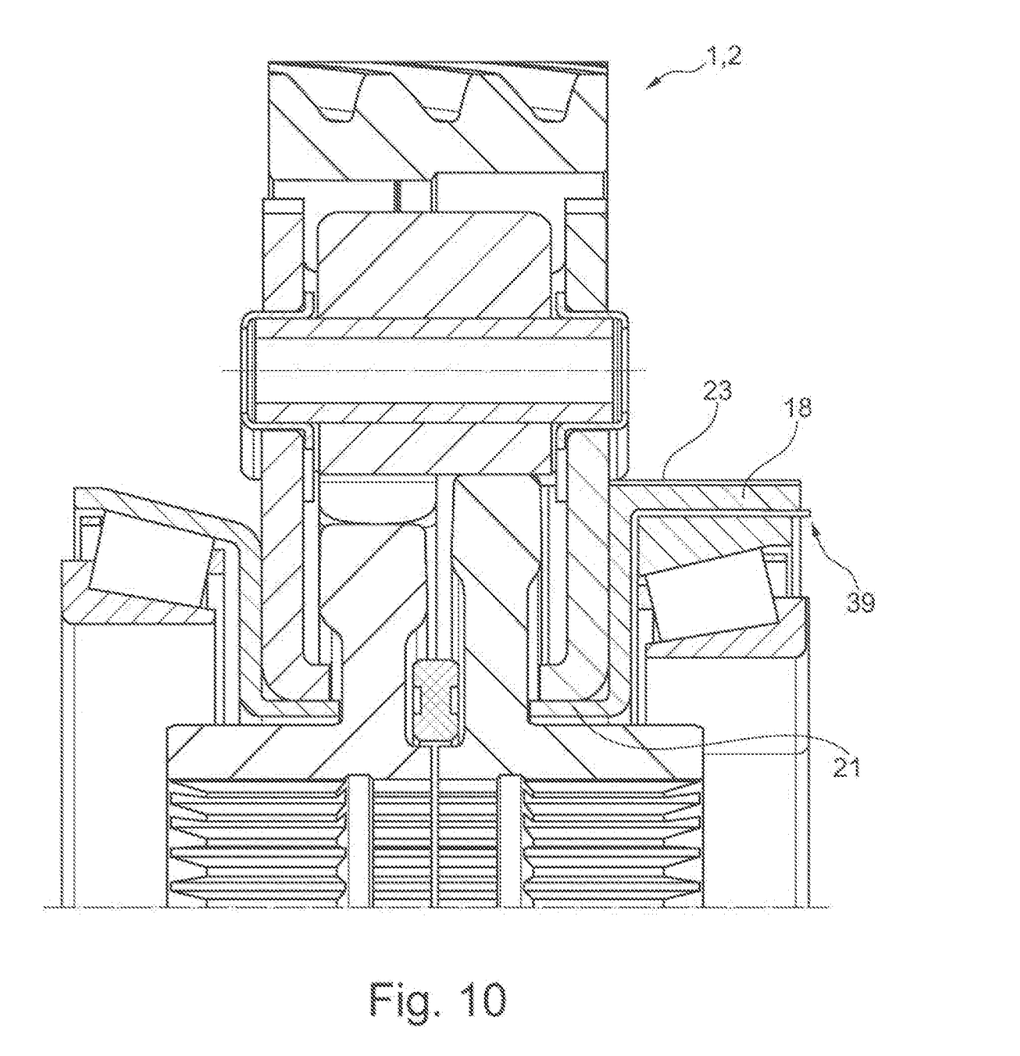
FIG. 10 shows a special caulked planetary gear configuration.

As can be seen in FIG. 10, caulking 39 is mounted axially spaced from sun gear 9 region of the bearing. On the left side of spur wheel differential gear 2, it can also be seen that at outer ring 28 of rolling bearing 20 constructed as a tapered roller bearing, second flange portion 23 is obliquely and/or transversely oriented relative to the radial direction and obliquely and/or transversely relative to the axial direction.

Figure 4:
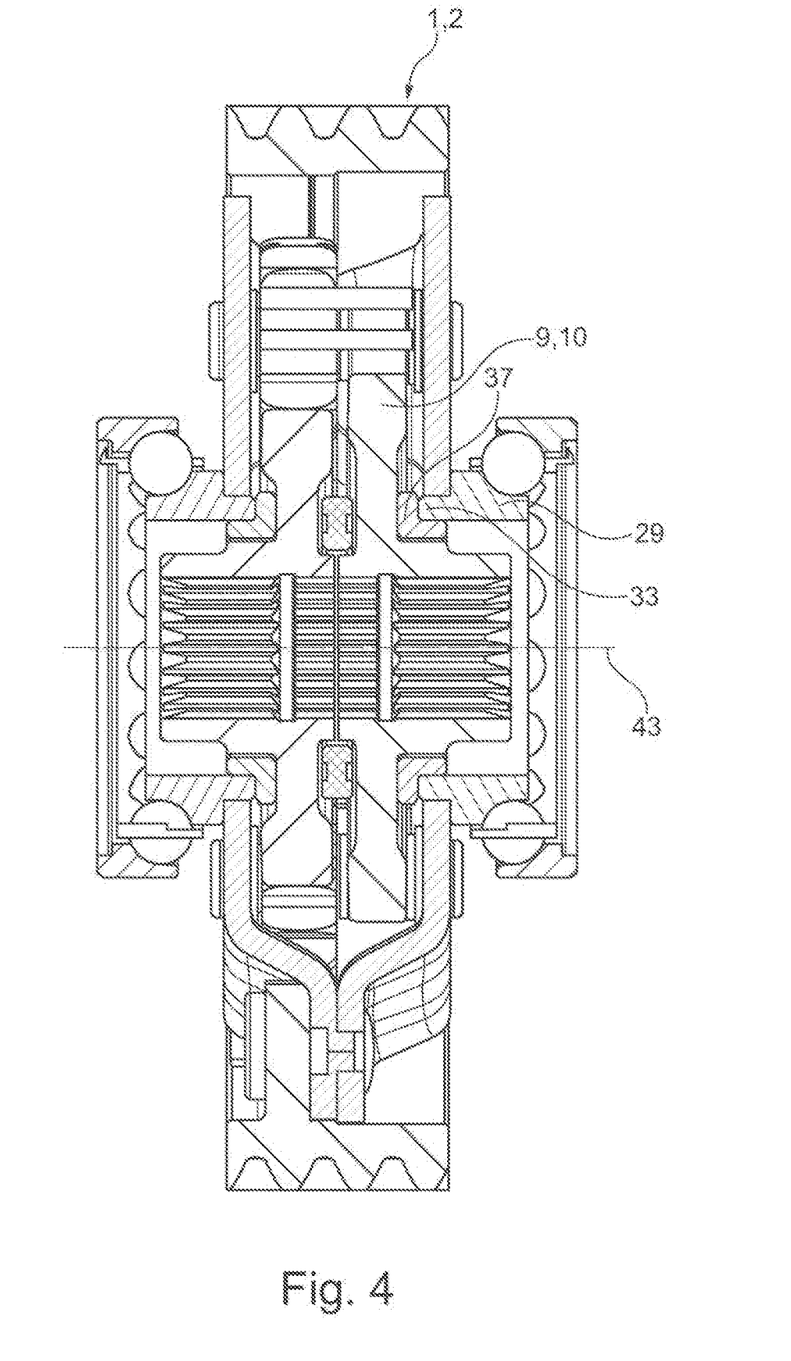
FIG. 4 shows a further longitudinal section of the planetary gear.

In the version according to FIG. 4, inner ring 29 is formed as extruded inner ring 29, whereas outer ring 28 is formed as a drawn outer bearing ring. In this way, the raceway characteristics are improved and the centering of the spur wheel differential ensured.

Returning to FIG. 1, it should be emphasized again that collar 31 is axially oriented, while two collar portions 32 and 33 are angled perpendicularly to planetary carrier 3 and connection part 18 with its connecting portion 22. In the gear according to FIG. 1, collar portions 32 and 33 have the same axial extension or axial length and both are in contact in with respective sun gear 10 or 11. Collar portions 32 and 33 are hardened, especially through-hardened. However, it is possible that in place of separate connecting members 18, one of the two bearing rings, i.e., outer bearing ring 28 or inner bearing ring 29, is so remodeled that it forms both first flange portion 21 as well as the respective raceway for rolling body 40.

In the gear according to FIG. 2, unlike in the gear according to FIG. 1, inner bearing ring 29 is connected with first half 12 of planetary carrier 3 via separate connection part 18. Connection part 18 is then applied to two surfaces of planetary carrier half 12. However, collar portion 33 of connection part 18 remains axially above collar portion 32 of planetary carrier 3 and, unlike collar portion 32, is in contact with first sun gear 10.

Figure 3:
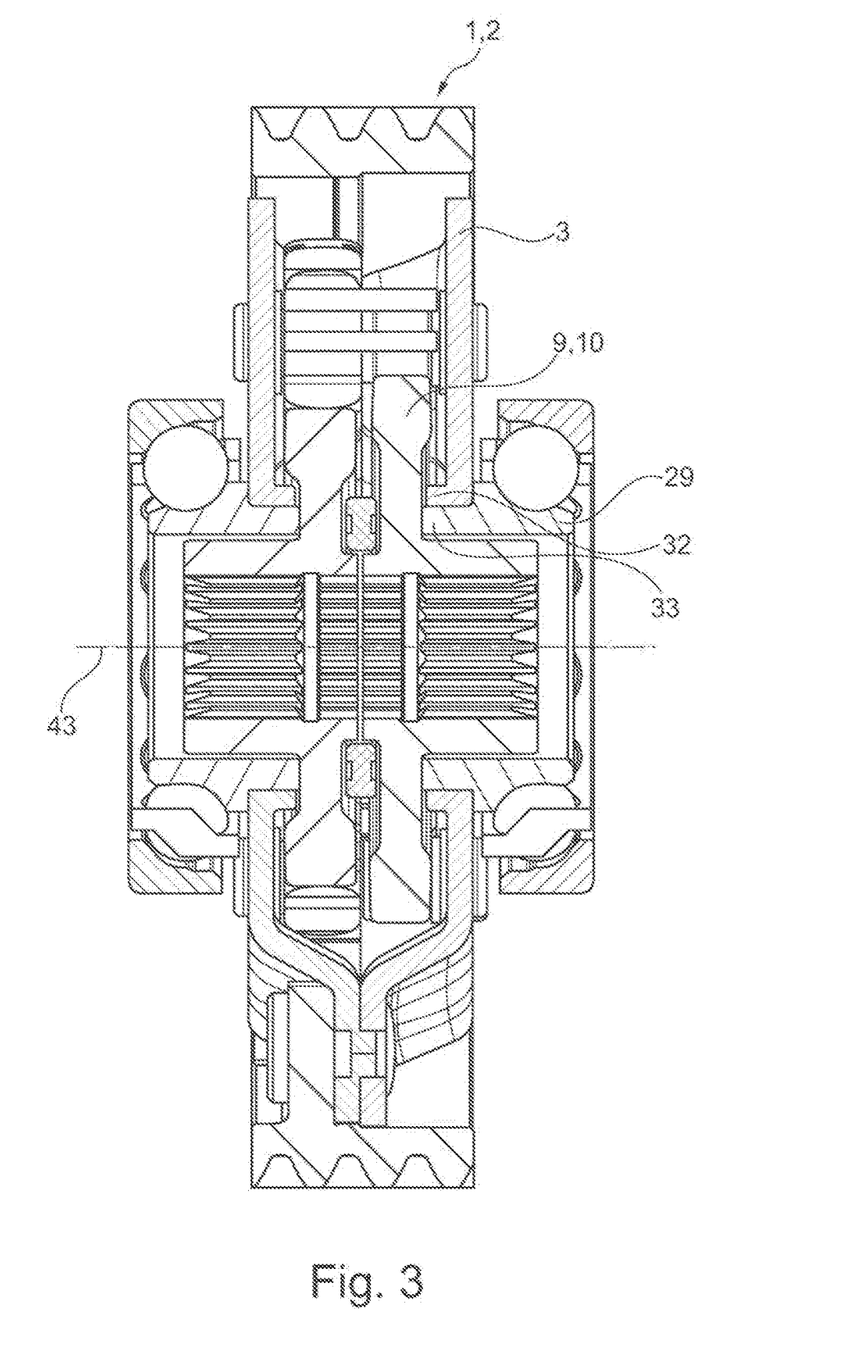
FIG. 3 shows a further longitudinal section of the planetary gear.
Figure 5:
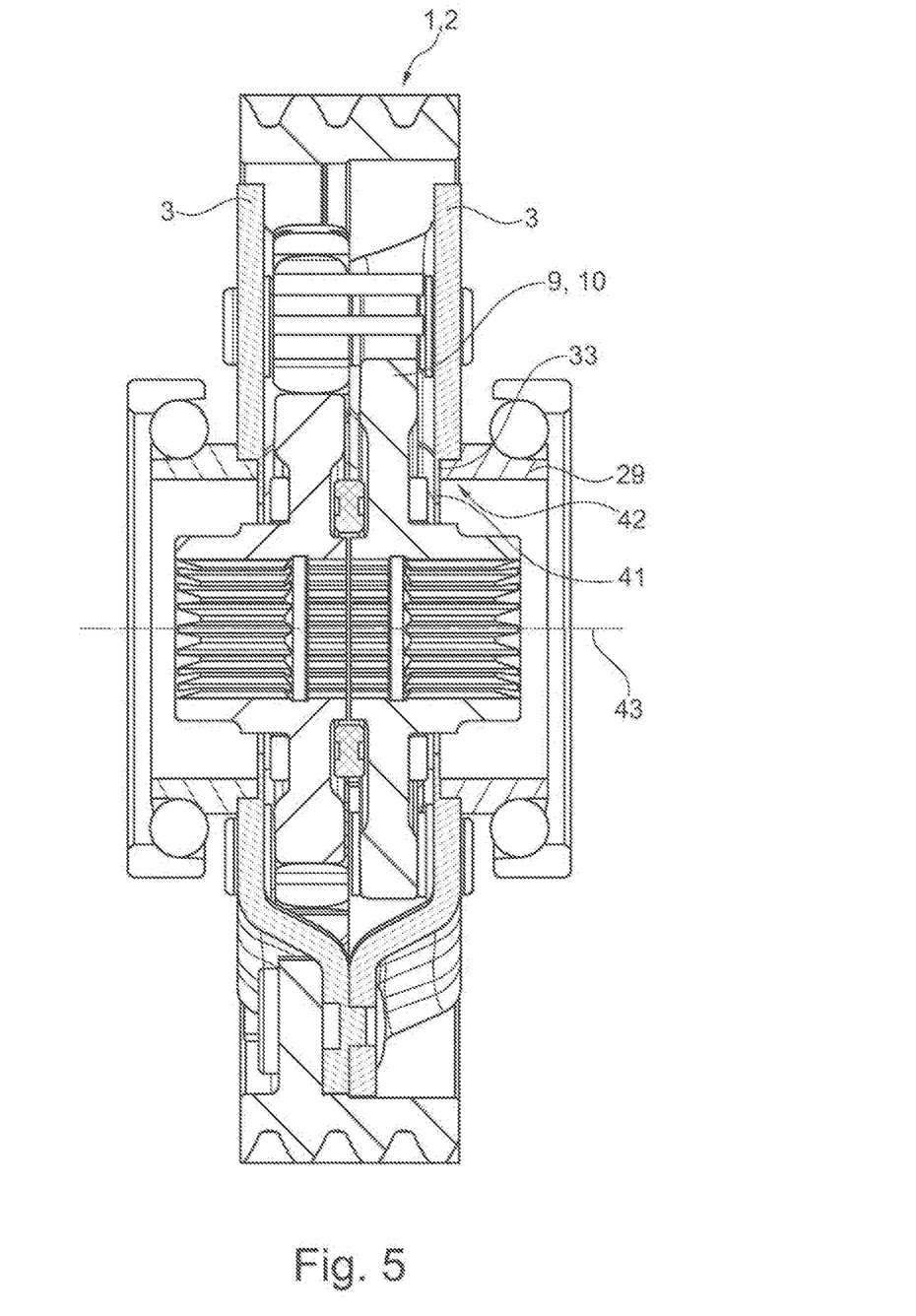
FIG. 5 shows a further longitudinal section of the planetary gear.

In the gear according to FIGS. 3 to 5, separate connection part 18 is dispensed with and inner bearing ring 29 has also collar portion 33. While planetary carrier 3 in FIG. 3 itself also has collar portion 32, this is missing in the gears of FIGS. 4 and 5. In fact, in the gear of FIG. 4, there is friction disc 37 between inner bearing ring 29 and sun gear 10. Further, in the gear according to FIG. 5 on the side of planetary carrier 3 facing sun gear 10, there is projection 41, while on the bearing-facing side there is recess 42 whereby collar portion 33 of inner bearing ring 29 at least partially fills recess 42. Projection 41 then forms an axial stop for inner bearing ring 29. In principle, inner bearing ring 29 may be connected via a frictional and/or positive connection, in particular using an interference fit with planetary carrier 3. Axis of rotation 43 of planetary carrier 3 is simultaneously the rotational axis of sun gear 9 and the axis of symmetry of these components.

Figure 6:
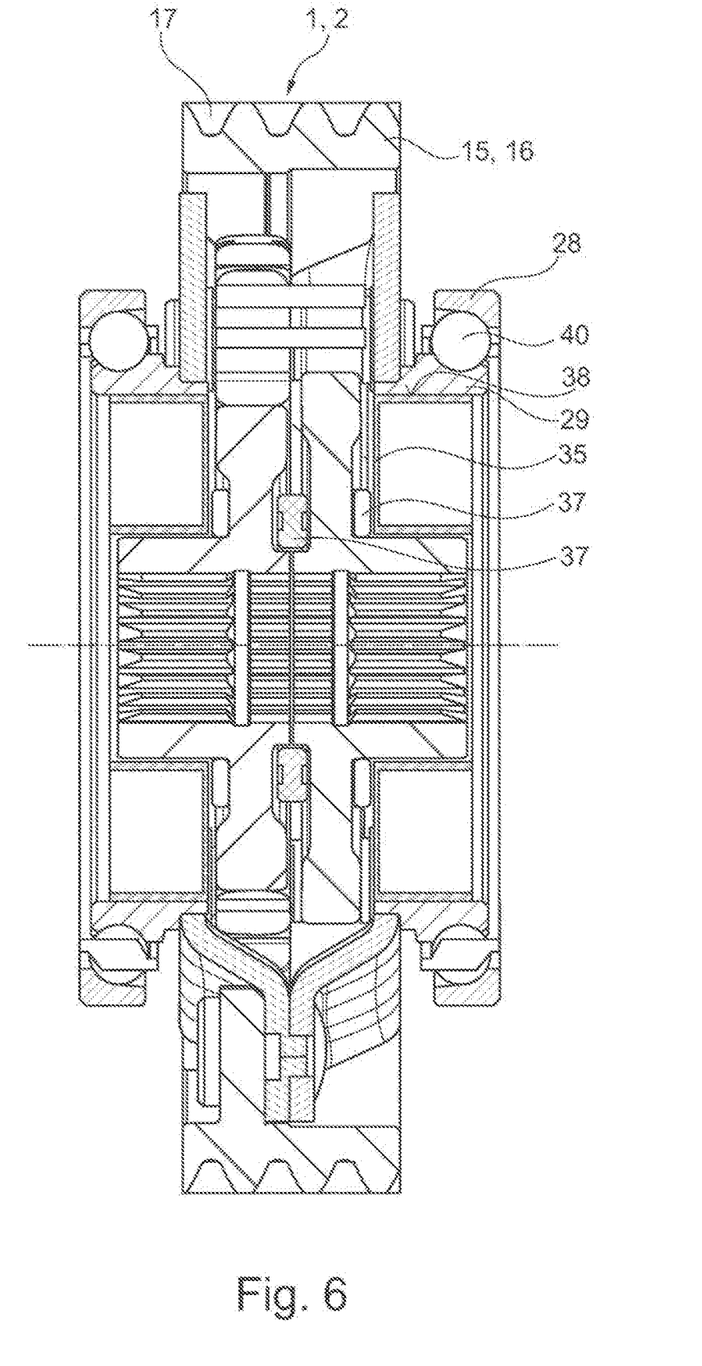
FIG. 6 shows a further longitudinal section of the planetary gear.

In the gear according to FIG. 6, the cover is thin-walled and is formed as a ring with a U-shaped cross-section. Unlike in the gear of FIG. 7, no additional recess is provided for friction disc 37. It should be noted that the rolling bodies used in bearing 19 are provided with reference numeral 40 and may generally be formed as balls, tapered rollers, needles or similar components. In particular, angular contact ball bearings and tapered roller bearings have proven to be sufficiently durable and inexpensive.

Figure 8:
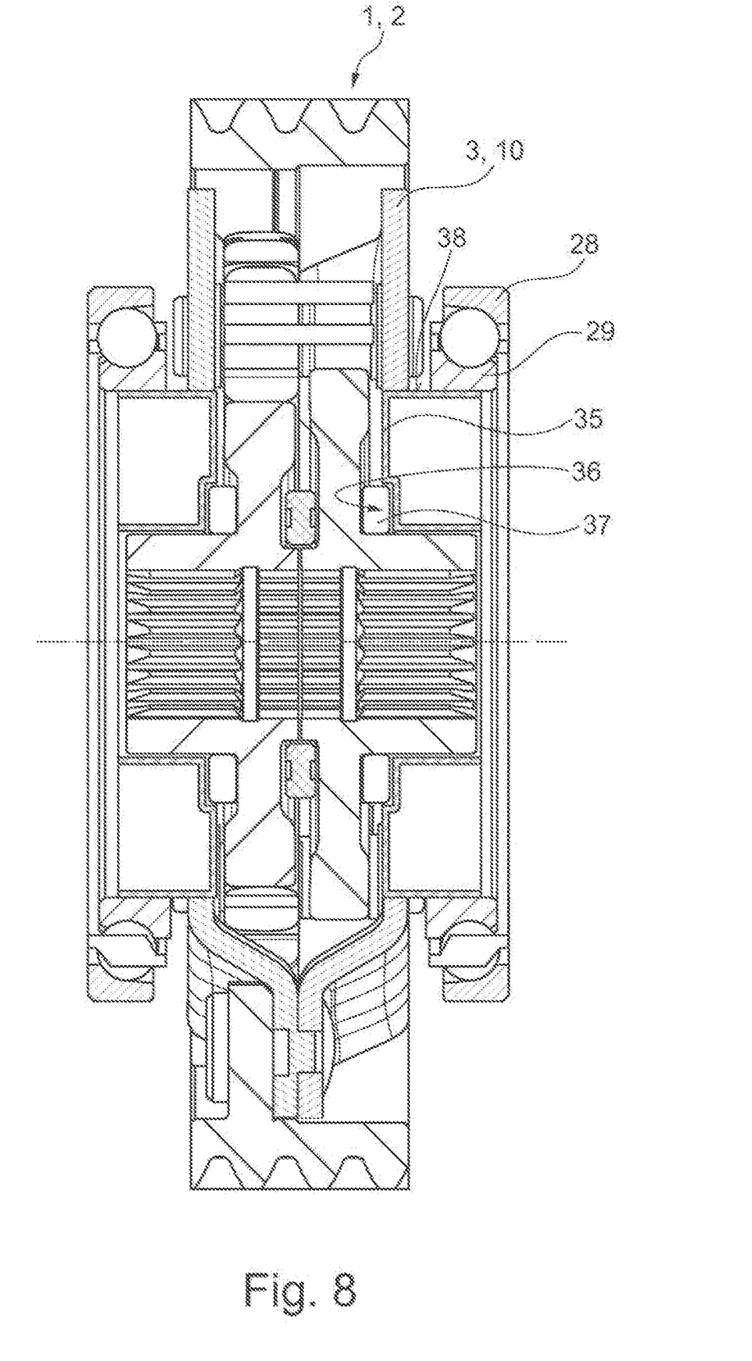
FIG. 8 shows a further planetary gear, which is also shown in the variants of FIGS. 6 and 7 in longitudinal section.

The gear according to FIG. 8 differs from the gear of FIG. 7 basically in the fact that inner bearing ring 29 is not brought into contact with planetary carrier 3 as cover 35 is interposed as a force-transmitting element. On outer surface 38 of cover 35, there thus sits both planetary carrier 3 with one or both halves 10 and 11 in a frictional and/or form-fitting manner as well as inner bearing ring 29. A modification is possible whereby, instead of inner bearing ring 29, outer bearing ring 28 is seated on the outer surface of cover 35.

Figure 9:
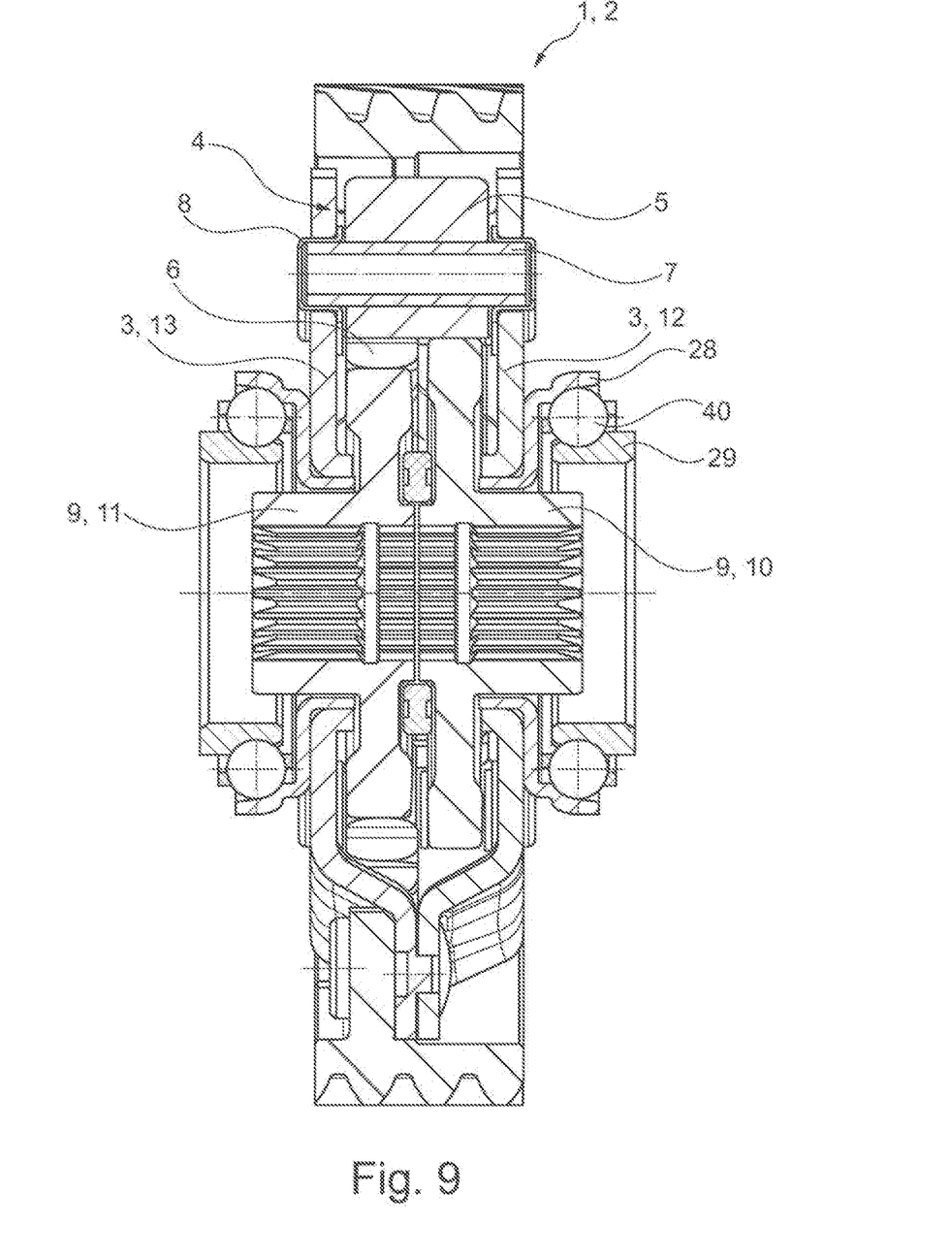
FIG. 9 shows a first embodiment of a planetary gear.

In FIG. 9 separate connection part 18 is, in turn, dispensed with and, by means of a modification of the first gear, the outer bearing ring, which is formed as a drawn outer bearing ring, is provided with an undulating outer shape.

Figure 11:
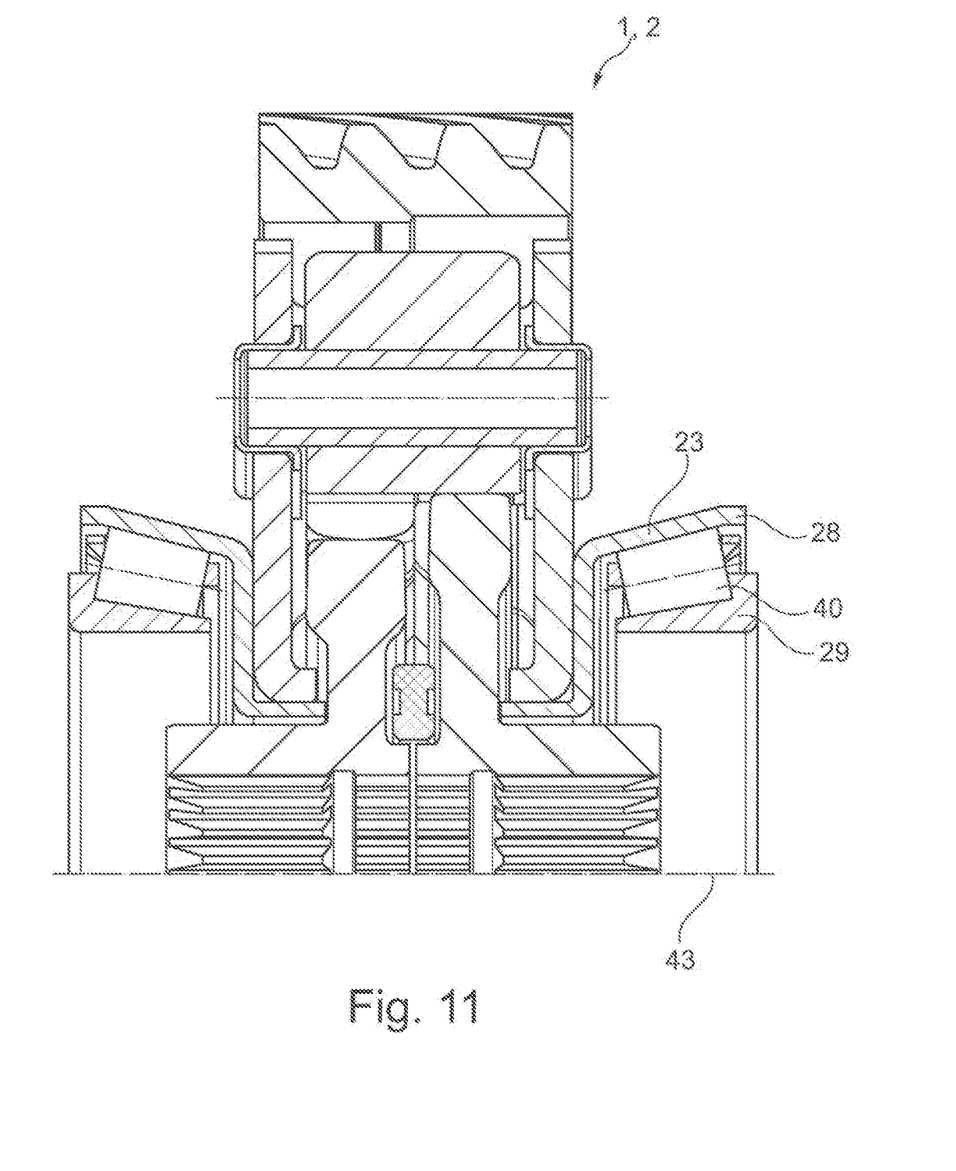
FIG. 11 shows a diagonally shaped connecting part construction in the region of the bearing with raceways of a further embodiment of a planetary gear.

While, as stated above regarding the gear of FIG. 10, connection part 18 is straight, i.e., has axially-oriented first and second flange portions 21 and 23 as shown in the gear according to FIG. 11, the second flange is also oriented obliquely to axis of rotation 43 and to the perpendicular radial direction extending there. Inner bearing ring 29 may be swaged.

The recessed hole through the circumferential profile contains axis of rotation 43.

LIST OF REFERENCE NUMBERS

1 Planetary gear
2 Spur wheel differential gear
3 Planetary carrier
4 Planetary wheel set
5 First planetary wheel
6 Second planetary wheel
7 Bolts
8 Bearing rings
9 Sun gear
10 First sun gear
11 Second sun gear
12 First half
13 Second half
14 Connecting element
15 Drive wheel
16 Spur wheel
17 Externally inclined teeth
18 Connection part
19 Bearing
20 Rolling bearing
21 First flange portion
22 Connecting portion
23 Second flange portion
24 First interface
25 Inner surface
26 Second interface
27 Outer surface
28 Outer bearing ring
29 Inner bearing ring
30 Inner ring surface
31 Collar
32 Collar portion of the planetary carrier
33 Collar portion of the connection part
34 Sprocket
35 Cover
36 Recess
37 Friction disc
38 Outer surface
39 Caulking
40 Rolling bodies
41 Projection
42 Recess
43 Axis of rotation
44 Inner diameter
45 Inner diameter

What is claimed is:
1. A planetary gear, comprising:
an axis of rotation;
a planetary carrier rotatable about the axis of rotation and having:
  a first inner diameter;
a first planetary wheel rotatively supported on the planetary carrier and in meshing engagement with a first sun gear, the first planetary wheel and first sun gear disposed at least partially within the planetary carrier;
a second planetary wheel rotatively supported on the planetary carrier and in meshing engagement with a second sun gear, the second planetary wheel and second sun gear disposed as least partially within the planetary carrier;
a drive wheel connected to the planetary carrier; and,
a rolling bearing supporting the planetary carrier for the axial and radial positioning of the planetary carrier with respect to a gear housing, the rolling bearing having:
  an outer bearing ring;
  an inner bearing ring disposed radially inward of the outer bearing ring and having a second inner diameter; and,
  a connection part disposed at least partially radially outward of the outer bearing ring and at least partially radially inward of the planetary carrier, wherein:

the first inner diameter is smaller than the second inner diameter.

2. The planetary gear as recited in claim 1, wherein the inner bearing ring is swaged.

3. The planetary gear as recited in claim 1, wherein the inner bearing ring has an axially projecting collar portion, which can be brought into contact with the first sun gear.

4. The planetary gear as recited in claim 1, wherein the planetary carrier has an axially projecting collar portion, which can be brought into contact with the first sun gear.

5. The planetary gear as recited in claim 1, wherein the outer bearing ring is formed as a one-piece cold-formed part with a raceway for a rolling body.

6. The planetary gear as recited in claim 1, wherein the planetary carrier extends radially further inwards than the inner bearing ring.

7. The planetary gear as recited in claim 1, wherein the planetary gear is designed as a spur wheel differential.

8. The planetary gear as recited in claim 7, wherein a friction disc is located between the first and second sun gears.

9. The planetary gear as recited in claim 1, wherein the outer bearing ring is connected material-wise with the planetary carrier.

10. The planetary gear as recited in claim 1, wherein the outer bearing ring is connected shape-wise with the planetary carrier.

11. The planetary gear as recited in claim 1, wherein the outer bearing ring is connected force-fitting-wise with the planetary carrier.

12. The planetary gear as recited in claim 1, wherein the connection part connects the planetary carrier with the rolling bearing and is deep-drawn.

13. A planetary gear, comprising:
an axis of rotation;
a planetary carrier rotatable about the axis of rotation;
a first planetary wheel rotatively supported on the planetary carrier and in meshing engagement with a first sun gear, the first planetary wheel and first sun gear disposed at least partially within the planetary carrier;
a second planetary wheel rotatively supported on the planetary carrier and in meshing engagement with a second sun gear, the second planetary wheel and second sun gear disposed as least partially within the planetary carrier;
a drive wheel connected to the planetary carrier; and,
a rolling bearing supporting the planetary carrier for the axial and radial positioning of the planetary carrier with respect to a gear housing, the rolling bearing having:
an inner bearing ring;
an outer bearing ring including a radial portion and a flange portion extending axially from the radial portion, wherein:
at least a part of the flange portion is disposed radially inward of the inner bearing ring and the planetary carrier.

14. A planetary gear, comprising:
an axis of rotation;
a planetary carrier rotatable about the axis of rotation;
a first planetary wheel rotatively supported on the planetary carrier and in meshing engagement with a first sun gear, the first planetary wheel and first sun gear disposed at least partially within the planetary carrier;
a second planetary wheel rotatively supported on the planetary carrier and in meshing engagement with a second sun gear, the second planetary wheel and second sun gear disposed as least partially within the planetary carrier;
a drive wheel connected to the planetary carrier; and,
a rolling bearing supporting the planetary carrier for the axial and radial positioning of the planetary carrier with respect to a gear housing, the rolling bearing having:
an inner bearing ring;
an outer bearing ring; and,
a connection part disposed at least partially radially outward of the outer bearing ring and including a radial portion and a flange portion extending axially from the radial portion, wherein:
at least a part of the flange portion is disposed radially inward of the inner bearing ring and the planetary carrier.

* * * * *